United States Patent
Yoshida (12) 
(10) Patent No.: US 7,038,813 B2
(45) Date of Patent: May 2, 2006

(54) IMAGE COMMUNICATION APPARATUS (75) Inventor: Takehiro Yoshida, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 729 days.

(21) Appl. No.: 09/954,069

(22) Filed: Sep. 18, 2001

(65) Prior Publication Data
US 2002/0039201 A1 Apr. 4, 2002

(30) Foreign Application Priority Data
Sep. 29, 2000 (JP) ............... 2000-300032

(51) Int. Cl.
G06F 15/00 (2006.01)
H04N 1/40 (2006.01)
H04N 1/00 (2006.01)
H04N 1/46 (2006.01)

(52) U.S. Cl. ............ 358/1.9; 358/449; 358/1.15; 358/500; 358/434; 358/435; 358/436

(58) Field of Classification Search ............ 358/1.9, 358/434–436, 438, 440, 500, 523, 449, 1.15
See application file for complete search history.

(56) References Cited

U.S. PATENT DOCUMENTS
6,005,673 A * 12/1999 Murai et al. ............... 358/434

* cited by examiner

Primary Examiner—Kimberly Williams
Assistant Examiner—Charlotte M. Baker
(74) Attorney, Agent, or Firm—Fitzpatrick, Cella, Harper & Scinto (57) ABSTRACT In an image communication apparatus capable of communicating color information, a receiver notifies a transmitter of information indicating that full-color data is receivable or unreceivable, information indicating that JPEG data is receivable or unreceivable, and information indicating that color data of a specific size is receivable or unreceivable. When the size of a document to be transmitted by the transmitter is B4 size or A3 size, and if the receiver has the capability to receive color information of B4 or A3 size, the transmitter transmits the document information in a color mode with the same magnification. If the receiver does not have the capability to receive color information of B4 or A3 size but has the capability to receive color information of A4 size, the transmitter transmits the image to be transmitted with the size reduced to A4 size.

4 Claims, 9 Drawing Sheets

| Bit No. | | DIS / DTC SIGNAL | DCS SIGNAL |
|---|---|---|---|
| 17 | 18 | | |
| 0 | 0 | A4 SIZE RECEIVABLE | A4 SIZE TRANSMISSION DESIGNATED |
| 0 | 1 | A3 SIZE RECEIVABLE | A3 SIZE TRANSMISSION DESIGNATED |
| 1 | 0 | B4 SIZE RECEIVABLE | B4 SIZE TRANSMISSION DESIGNATED |
| 1 | 1 | INVALID | INVALID |
| 68 | | JPEG RECEIVABLE / UNRECEIVABLE | JPEG TRANSMISSION DESIGNATED |
| 69 | | FULL-COLOR MODE RECEIVABLE / UNRECEIVABLE | FULL-COLOR MODE TRANSMISSION DESIGNATED |
| (X, X+1) | | | |
| 0 | 0 | COLOR A4 SIZE RECEIVABLE | COLOR A4 SIZE TRANSMISSION DESIGNATED |
| 0 | 1 | COLOR A3 SIZE RECEIVABLE | COLOR A3 SIZE TRANSMISSION DESIGNATED |
| 1 | 0 | COLOR B4 SIZE RECEIVABLE | COLOR B4 SIZE TRANSMISSION DESIGNATED |
| 1 | 1 | INVALID | INVALID |

IMAGE COMMUNICATION APPARATUS

BACKGROUND OF THE INVENTION

1. Field of the Invention

The present invention relates to an image communication apparatus such as a facsimile machine, and more particularly to an image communication apparatus capable of communicating color information.

2. Description of the Related Art

Conventionally, facsimile machines are designed to transmit monochrome information. In a facsimile system supporting transmissions of monochrome information, a receiver notifies a transmitter of which size images, A4, B4, or A3, is receivable, and the transmitter notifies the receiver of which document size is being transmitted to the receiver, more specifically, which document size images, A4, B4, or A3, is being transmitted.

Under the ITU-T recommendations, however, color transmissions larger than A4 size have not been supported.

Therefore, if a transmission with color information of B4 size is selected, the document information is reduced from B4 size to A4 size before being transmitted if the intended receiver has the capability to receive color data, or if bit values 68 and 69 in FIF (facsimile information field) of DIS (digital identification signal) indicate "JPEG (Joint Photographic Experts Group) data receivable" and "full-color data receivable," respectively.

Therefore, a problem is that the color information would be reduced from B4 size to A4 size and then transmitted if the intended receiver has the capability to receive color information of B4 size.

SUMMARY OF THE INVENTION

Accordingly, it is an object of the present invention to provide an image communication apparatus and a method of controlling the same which eliminates the foregoing disadvantage.

Another object of the present invention is to provide an image communication apparatus and a method of controlling the same capable of transmitting color documents larger than A4 size with the same magnification when the intended receiver has the capability to receive color images larger than A4 size.

Still another object of the present invention is to provide an image communication apparatus and a method of controlling the same which individually notifies the maximum size of monochrome data and color data to be received so that the receiving capability of the intended receiver may be fully utilized.

Further objects, features and advantages of the present invention will become apparent from the following description of the preferred embodiments with reference to the attached drawings, and the description set forth in the appended claims.

DESCRIPTION OF THE PREFERRED EMBODIMENTS

First Embodiment

Figure 1:
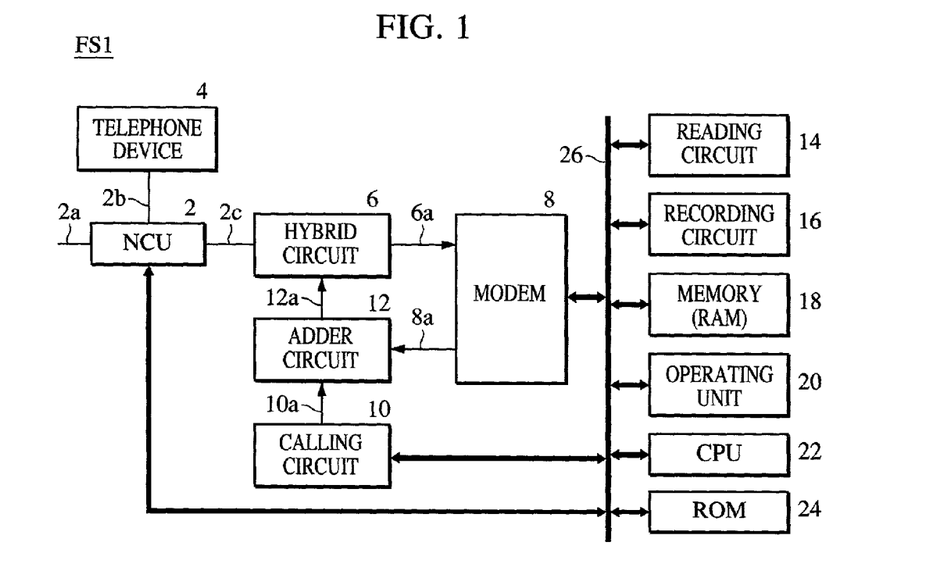
FIG. 1 is a block diagram of a facsimile system according to an embodiment of the present invention.

FIG. 1 is a block diagram of the configuration of a facsimile machine FS1 according to a first embodiment of the present invention.

The facsimile system FS1 includes an NCU (network control unit) 2. In order to use a telephone network for data transmissions etc., the NCU 2 is connected to terminals of telephone lines to control interconnection of a switched telephone network, switch to a data communication path, or hold the loop. Furthermore, the NCU 2 connects a telephone line 2a to a telephone device 4 (or turns off a CML (connect modem to line) function) or connects the telephone line 2a to a facsimile machine (or turns on the CML function) in response to a control signal from a bus 26. In a normal state, the telephone line 2a is connected to the telephone device 4.

A hybrid circuit 6 serving to separate a transmission signal from a reception signal forwards the transmission signal from an adder circuit 12 to the telephone line 2a via the NCU 2, and receives the signal from another party via the NCU 2 to transmit the received signal to a modem 8 via a signal line 6a.

The modem 8 modulates and demodulates according to the ITU-T recommendations V. 8, V. 21, V. 27 ter, V. 29, V. 17, and V. 34, and each transmission mode is designated according to a control signal from the bus 26. The modem 8 receives the transmission signal from the bus 26 to output the modulated data to a signal line 8a, and receives the transmission signal output to the signal line 6a to output the demodulated data to the bus 26.

A calling circuit 10 receives telephone number information according to the signal from the bus 26, and outputs a DTMF selection signal to a signal line 10a.

The adder circuit 12 receives and adds the information from the signal line 8a and the information from the signal line 10a, and outputs the result of the calculation to a signal line 12a.

A reading circuit 14 reads color information in a document, and outputs the read data to the bus 26.

A recording circuit 16 which is capable of recording the color information sequentially records the information output to the bus 26 in a line-by-line basis.

A memory circuit 18 is used as a work memory (RAM), and is used to store raw information of the read data or coded information, the received information or decoded information, and the like via the bus 26.

An operating unit 20 includes a one-push dial key, a short-dial key, a ten-key pad, an asterisk (*) key, a sharp (#) key, a start key, a stop key, a set key, a color transmission selecting key, a register key to the memory 18, and other function keys. The information on the key which is being depressed is output to the bus 26.

The operating unit 20 includes a display unit for receiving and displaying the information output to the bus 26.

A CPU (central processing unit) 22 controls the overall facsimile system FS1, and performs the facsimile transmission control process. A control program of the process is stored in a ROM 24.

The ROM 24 may include a unit for notifying that full-color data is receivable or unreceivable, that JPEG data is receivable or unreceivable, that color data of a specific size (in particular, B4 size or A3 size) is receivable or unreceivable if it serves as a recipient component. The ROM 24 further serves as a transmitter component, and contains a control program to, when a transmission of color data at a specific size is selected, if designate a transmission of color data of the specific size, a transmission of full-color data, and a transmission of JPEG data if the intended receiver has the capability to receive color data at the specific size, so that the transmission of color data of the specific size may be executed.

In a transmission of color data, when a transmission of color data of a specific size is selected, and if the intended receiver has the capability to receive color data but does not have the capability to receive color data of the specific size (for example, it has the capability to receive color data up to A4 size), a transmission of color data at the existing size, a transmission of full-color data, and a transmission of JPEG data are designated, so that the transmission of color data after the information has been reduced from the specific size to the existing size (in particular, A4 size) may be executed.

More specifically, the transmitter contains a control program to, when a transmission of color data of A3 size is selected, execute a transmission of color data of A3 size if the receiver has the capability to receive color data of A3 size; to execute a transmission of color data of B4 size if the receiver does not have the capability to receive color data of A3 size but has the capability to receive color data of B4 size; and to execute a transmission of color data of A4 size if the receiver has the capability to receive color data, but does not have the capability to receive color data of A3 size or B4 size.

Figure 2:
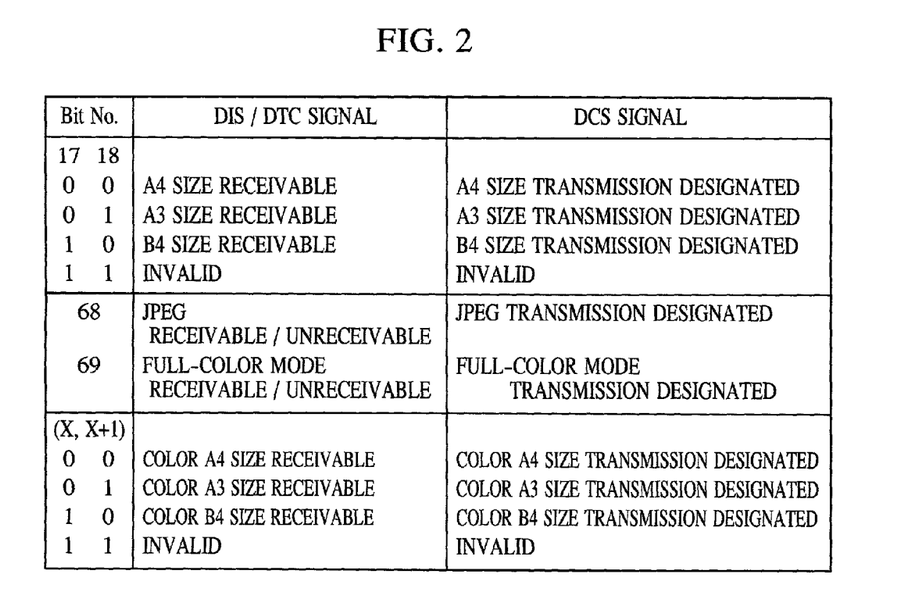
FIG. 2 is a view of an exemplary protocol of a color transmission according to the embodiment.
Figure 3:
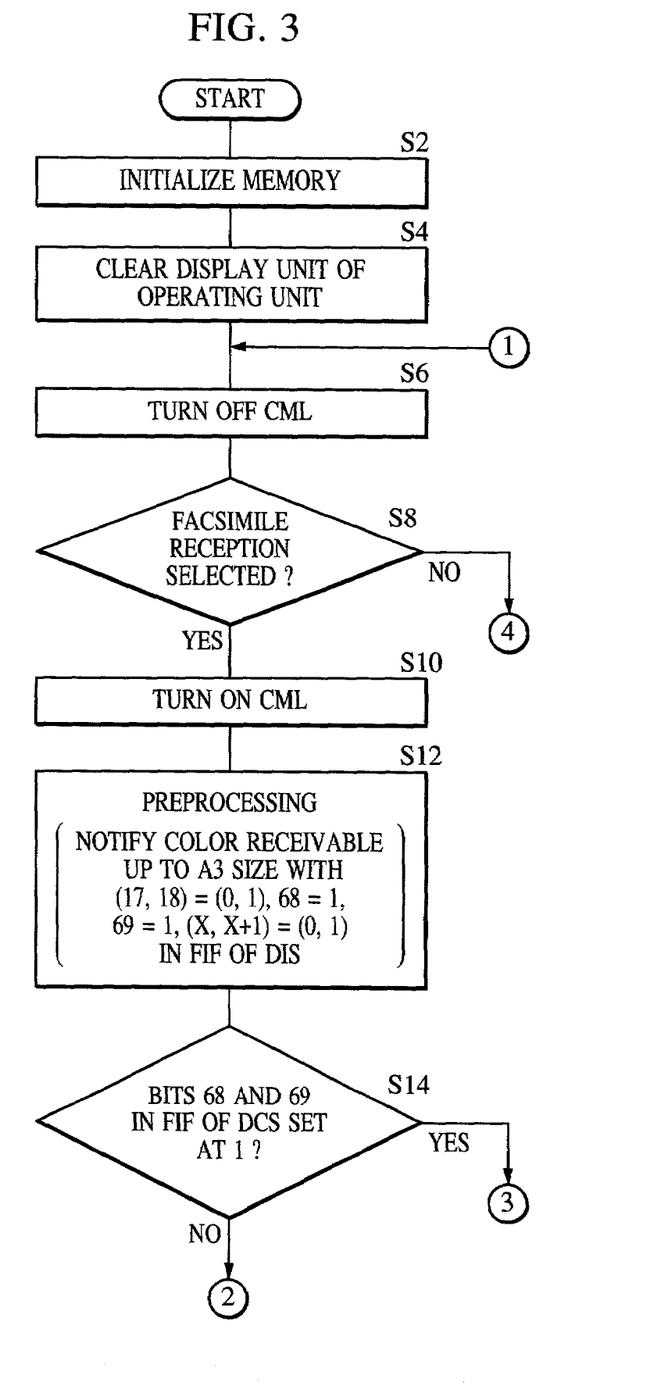
FIG. 3 is a flowchart of a control operation of the facsimile system shown in FIG. 1.
Figure 4:
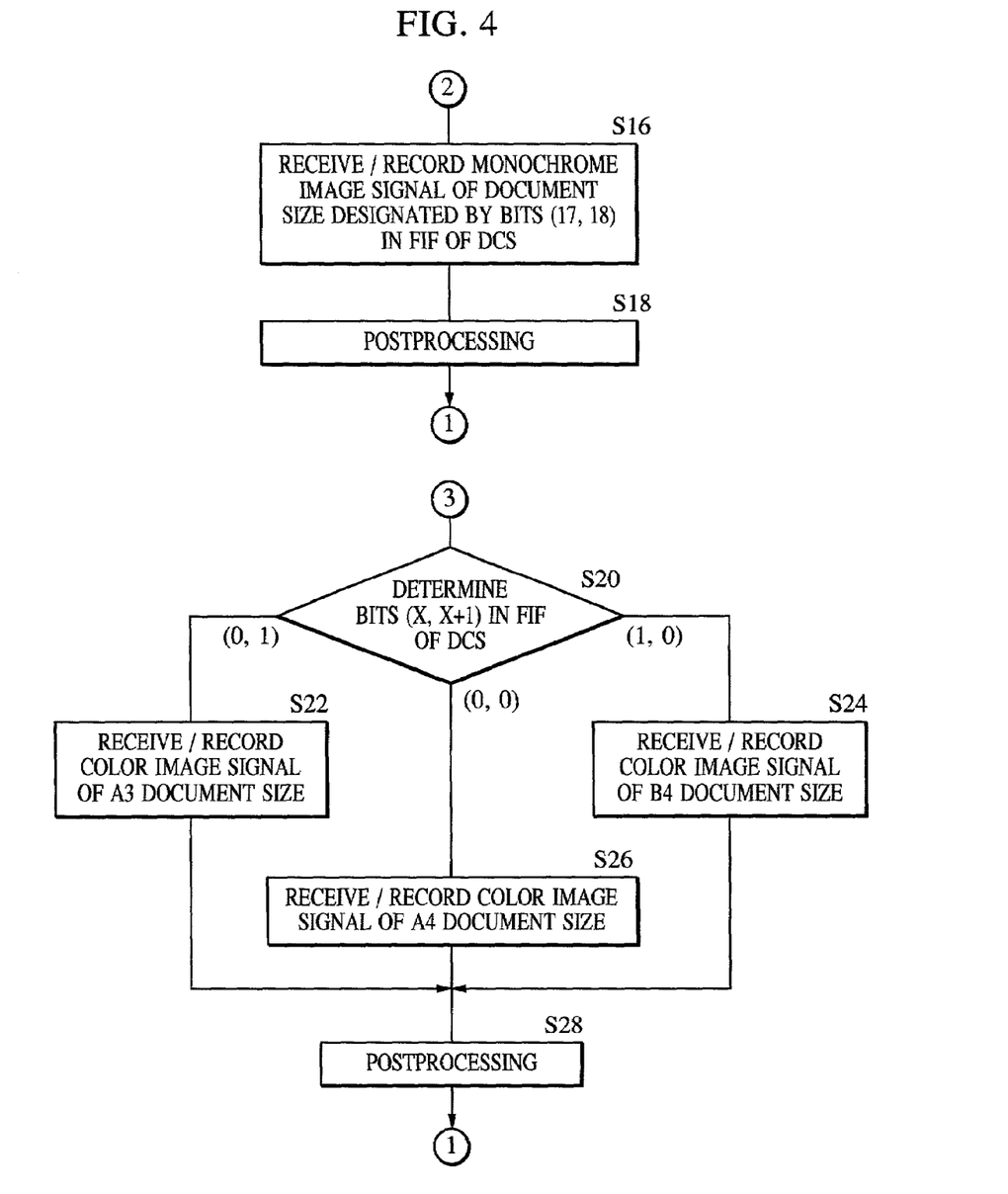
FIG. 4 is a flowchart of the control operation of the facsimile system shown in FIG. 1.
Figure 5:
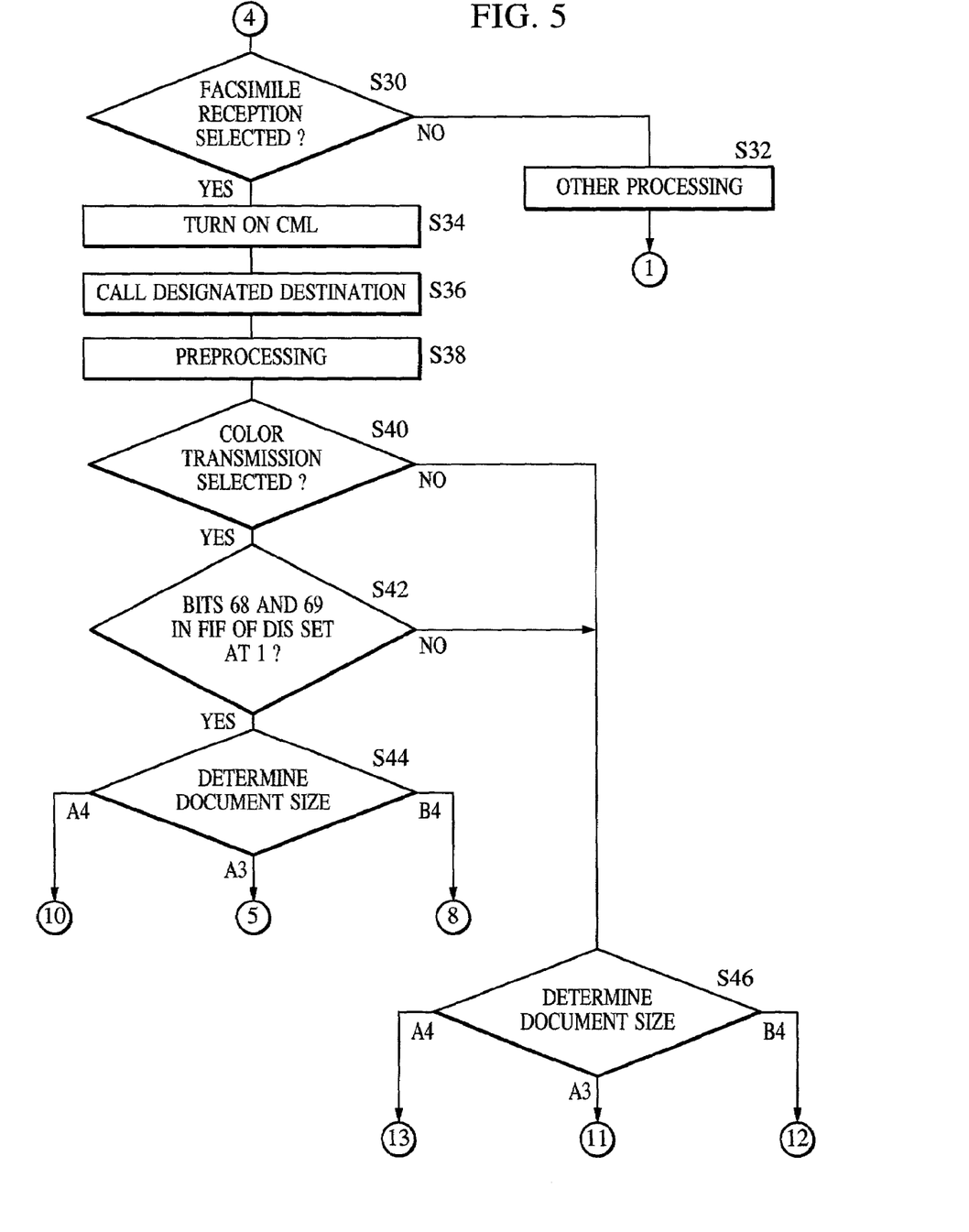
FIG. 5 is a flowchart of the control operation of the facsimile system shown in FIG. 1.
Figure 6:
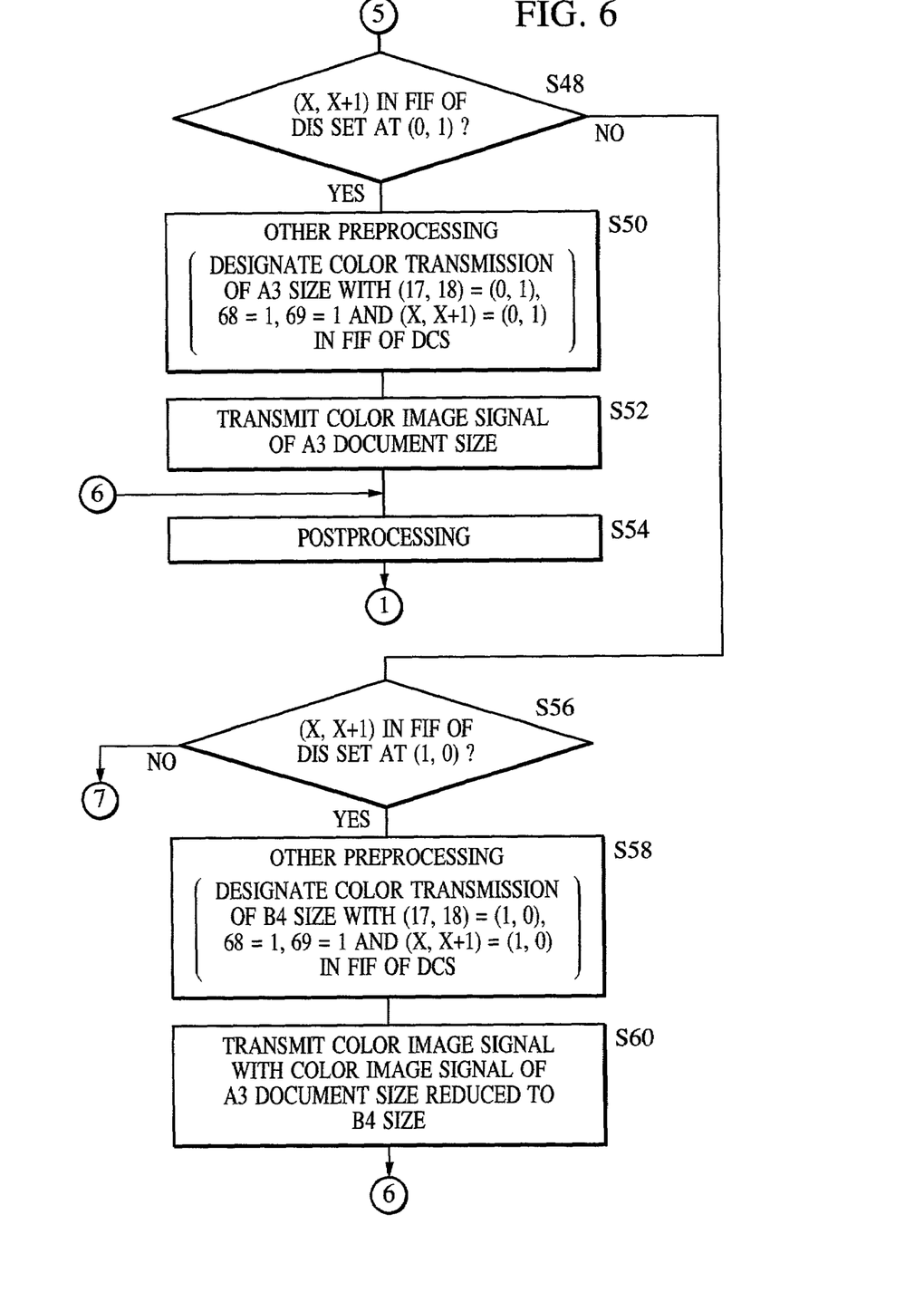
FIG. 6 is a flowchart of the control operation of the facsimile system shown in FIG. 1.
Figure 7:
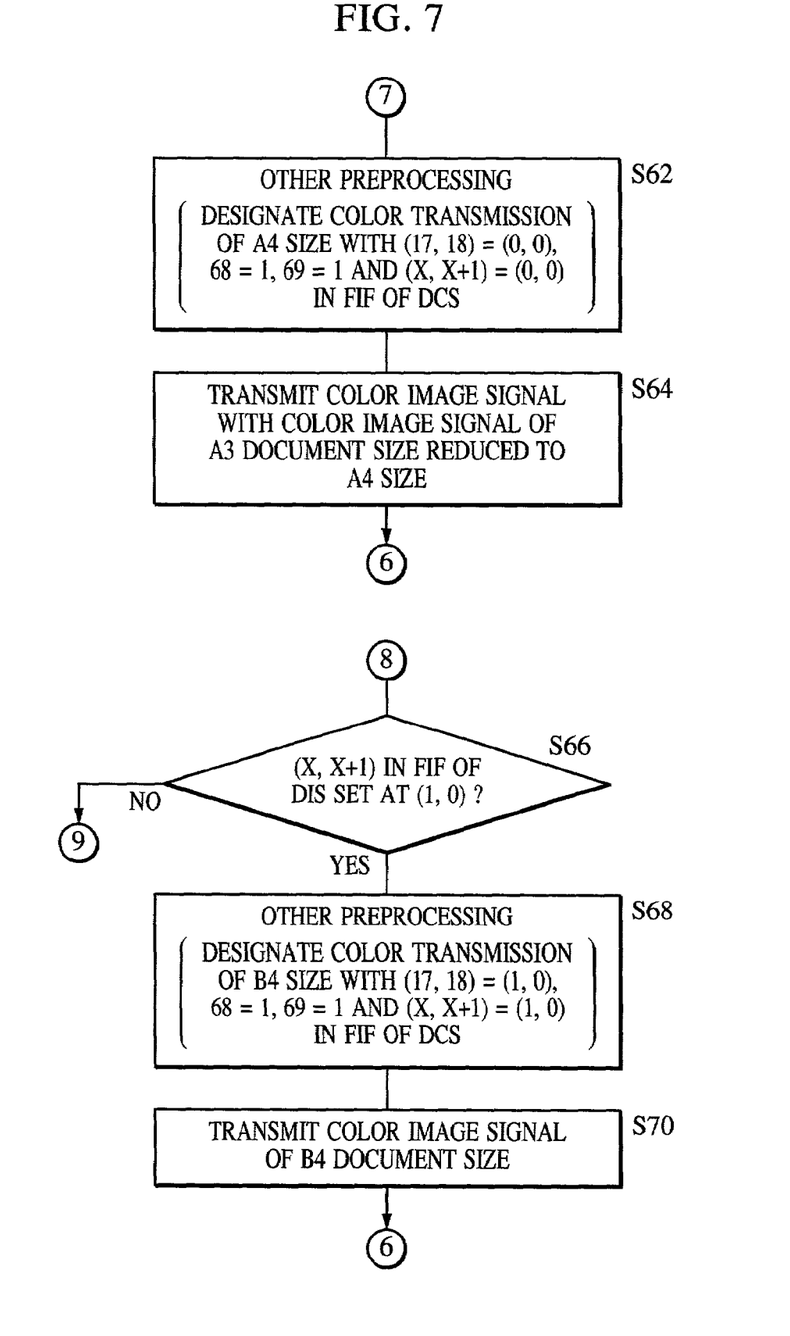
FIG. 7 is a flowchart of the control operation of the facsimile system shown in FIG. 1.
Figure 8:
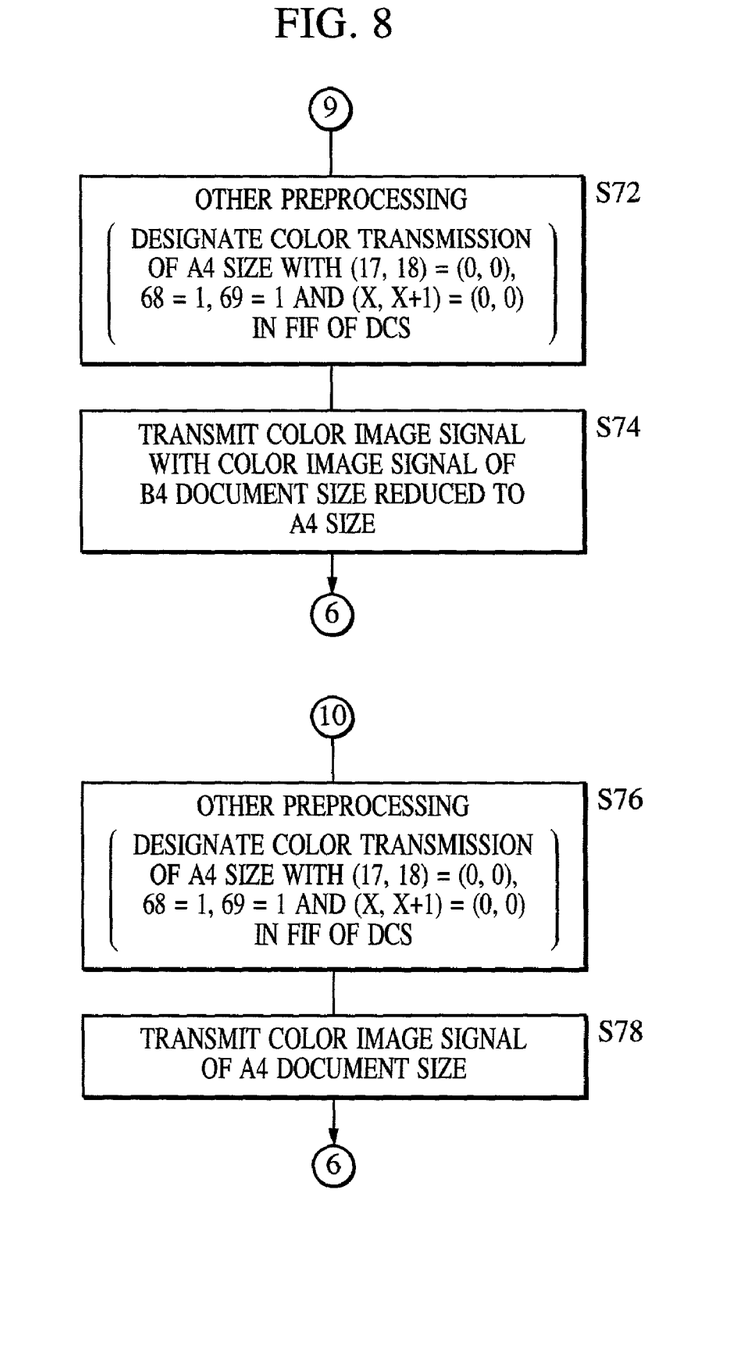
FIG. 8 is a flowchart of the control operation of the facsimile system shown in FIG. 1.
Figure 9:
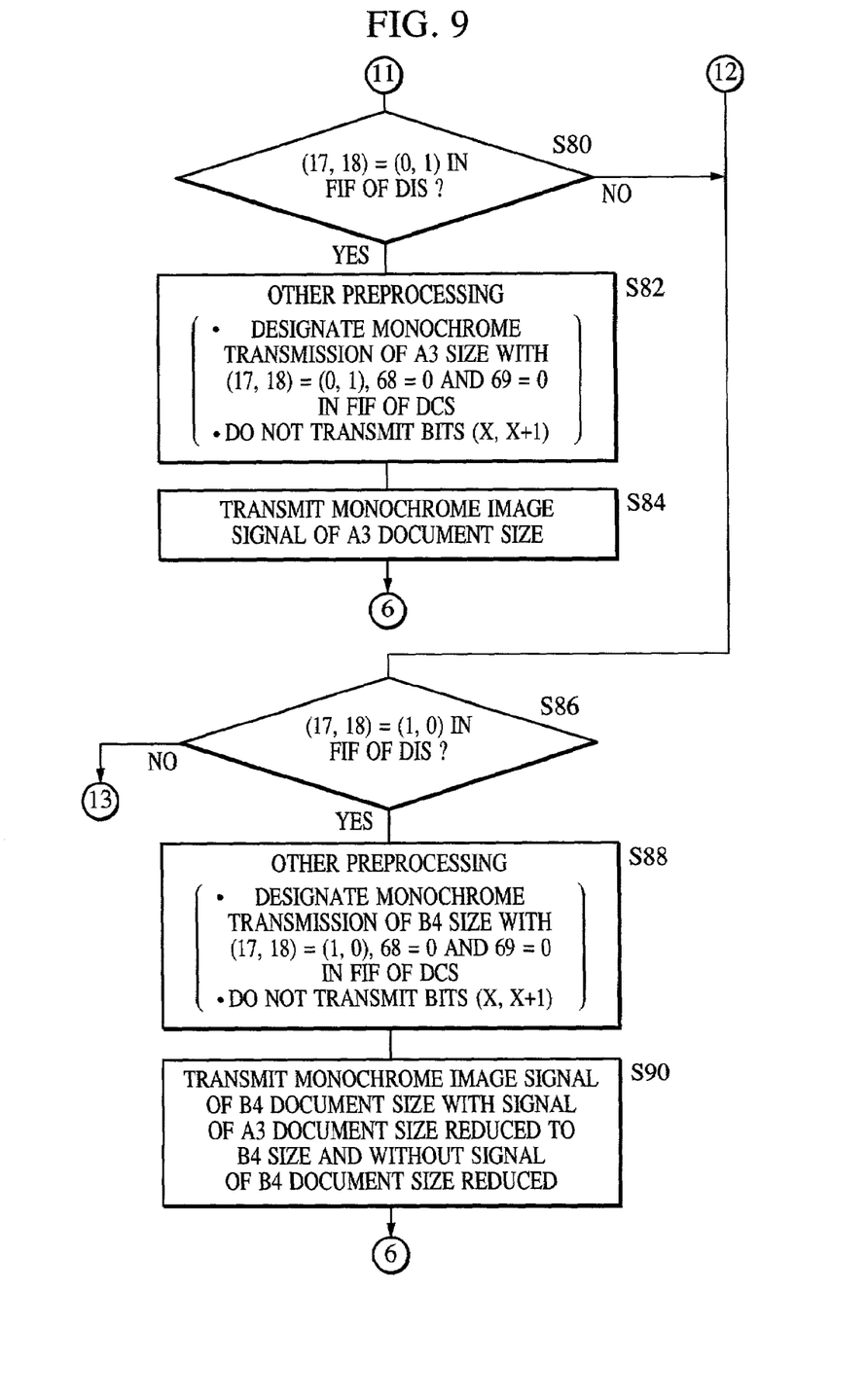
FIG. 9 is a flowchart of the control operation of the facsimile system shown in FIG. 1.
Figure 10:
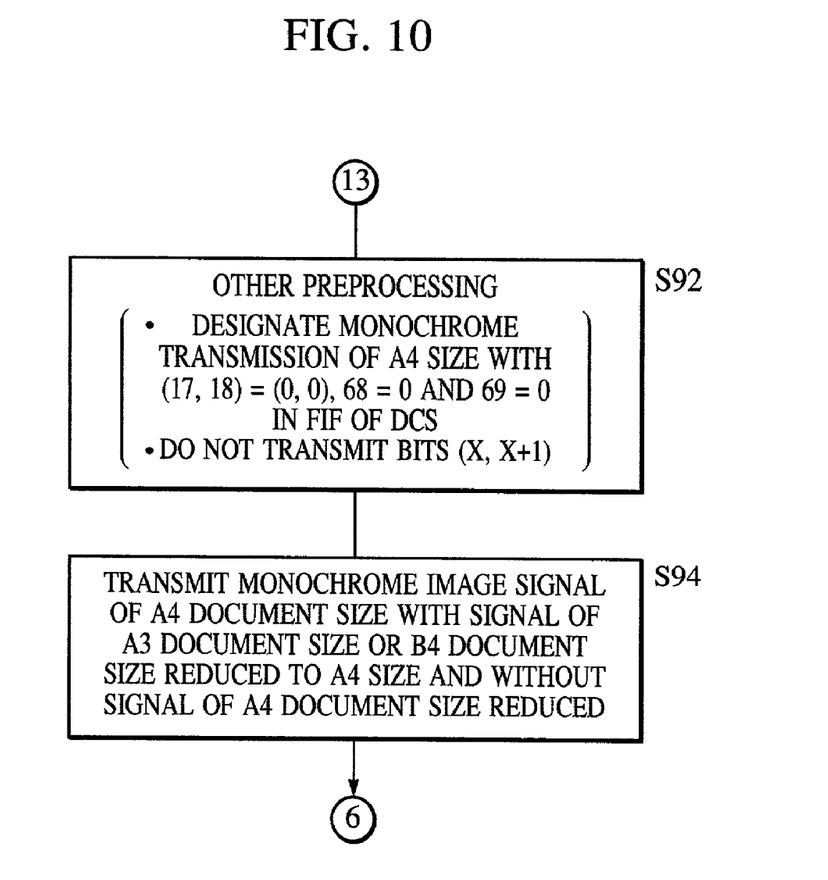
FIG. 10 is a flowchart of the control operation of the facsimile system shown in FIG. 1.

FIG. 2 is a view of an exemplary protocol of color transmission in accordance with the illustrated embodiment.

As shown in FIG. 2, bits 17, 18, 68, and 69 in FIF (facsimile information field) of DIS (digital identification signal), DTC (digital transfer command), and DCS (digital command signal) are assigned to the information prescribed in the current ITU-T recommendations. Additional bits X and X+1 are prescribed herein.

Bits (17, 18) in FIF of DIS and DTC are assigned to declaration that monochrome data is receivable. (0, 0) indicates that monochrome data of A4 size is receivable; (0, 1) indicates that monochrome data of A3 size is receivable; (1, 0) indicates that monochrome data of B4 size is receivable; and (1. 1) indicates invalid reception. In summary, bits (17, 18) in FIF of DIS and DTC provide information indicating the maximum size in reception of monochrome data.

Bits (17, 18) in FIF of DCS are assigned to declaration that a transmission of monochrome data is designated. (0, 0) indicates that a transmission of monochrome data of A4 size is designated; (0, 1) indicates that a transmission of monochrome data of A3 size is designated; (1, 0) indicates that a transmission of monochrome data of B4 size is designated; and (1. 1) indicates invalid transmission. In summary, bits (17, 18) in FIF of DCS provide information indicating the transmission size in transmission of monochrome data.

Bit 68 in FIF of DIS and DTC is assigned to declaration that JPEG coded data is receivable or unreceivable, and bit 68 in FIF of DCS is assigned to declaration that a transmission of JPEG coded data is designated.

Bit 69 in FIF of DIS and DTC is assigned to declaration that full-color mode data is receivable or unreceivable, and bit 69 in FIF of DCS signal is assigned to declaration that a transmission of full-color mode data is designated.

Bits (X, X+1) in FIF of DIS and DTC are assigned to declaration that color data is receivable. (0, 0) indicates that color data of A4 size is receivable; (0, 1) indicates that color data of A3 size is receivable; (1, 0) indicates that color data of B4 size is receivable; (1. 1) indicates invalid reception. In summary, bits (X, X+1) in FIF of DIS and DTC provide information indicating the maximum size in reception of color data.

Bits (X, X+1) in FIF of DCS are assigned to declaration that a transmission of color data is designated. (0, 0) indicates that a transmission of color data at A4 size is designated; (0, 1) indicates that a transmission of color data at A3 size is designated; (1, 0) indicates that a transmission of color data of B4 size is designated; and (1. 1) indicates invalid transmission. In summary, bits (X, X+1) in FIF of DCS provide information indicating the transmission size in transmission of color data.

In this way, the receiving capability and the transmission mode each are declared separately for monochrome data and color data.

FIGS. 3 through 10 are flowcharts of a control operation of the facsimile system FS1 shown in FIG. 1.

At step S2, the memory 18 is initialized via the bus 26.

At step S4, the display unit in the operating unit is cleared via the bus 26.

At step S6, the CML function of the NCU 2 is turned off via the bus 26.

At step S8, it is determined whether or not facsimile reception is found, and if YES is determined, the control proceeds to step S10. Otherwise, if NO is determined, the control proceeds to step S30.

At step S10, the CML function of the NCU 2 is turned off via the bus 26.

Step S12 represents preprocessing. With bits (17, 18) in FIF of DIS set at (0, 1), bit 68 at 1, bit 69 at 1, and bits (X, X+1) at (0, 1), it is declared that color data up to A3 size is receivable (of course, monochrome data up to A3 size is also receivable).

At Step S14, it is determined whether or not bits 68 and 69 in FIF of DCS are set at 1, and if YES is determined, the control proceeds to step S20. Otherwise, if NO is determined, the control proceeds to step S16.

At step S16, a monochrome image signal is received and recorded at the document size prescribed by bits (17, 18) in FIF of DCS.

At step S18, postprocessing is performed.

At step S20, bits (X, X+1) in FIF of DCS are determined. If the bit value is set at (0, 1), the control proceeds to step S22, in which it is determined as a color image signal having a document size of A3 size which is then received and recorded. If the bit values are set at (1, 0), the control proceeds to step S24, in which it is determined as a color image signal having a document size of B4 size which is then received and recorded. If the bit values are set at (0, 0), the control proceeds to step S26, in which it is determined as a color image signal having a document size of A4 size which is then received and recorded.

At step S28, postprocessing is performed.

At step S30, the information of the operating unit 20 is received, and it is determined whether or not facsimile reception is selected. If YES is determined, the control proceeds to step S34; otherwise, if NO is determined, the control proceeds to step S32, leading to the subsequent processes.

At step S34, the CML function of the NCU 2 is turned on via the bus 26.

At step S36, the calling circuit 10 is used via the bus 26 to call the designated destination.

Step S38 represents preprocessing.

At step S40, the information of the operating unit 20 is received via the bus 26, and it is determined whether or not a color transmission is selected. If YES is determined, the control proceeds to step S42; otherwise, if NO is determined, the control proceeds to step S46.

At step S42, it is determined whether or not both bits 68 and 69 in FIF of DCS from another party are set at 1. If YES is determined, the control proceeds to step S44; otherwise, if NO is determined, the control proceeds to step S46.

At step S44, the document size in the color transmission is determined. If a document size of A3 size is determined, the control proceeds to step S48. If a document size of B4 size is determined, the control proceeds to step S66. If a document size of A4 size is determined, the control proceeds to S76.

At step S46, the document size in the monochrome transmission is determined. If a document size of A3 size is determined, the control proceeds to step S80. If a document size of B4 size is determined, the control proceeds to step S86. If a document size of A4 size is determined, the control proceeds to S92.

At step S48, it is determined whether or not bits (X, X+1) in FIF of DIS are set at (0, 1). If YES is determined, the control proceeds to step S50; otherwise, if NO is determined, the control proceeds to step S56.

At step S50, other preprocessing is performed. With bits (17, 18) in FIF of DIS set at (0, 1), bit 68 at 1, bit 69 at 1, and bits (X, X+1) at (0, 1), the designation of transmission of color data at A3 size is declared.

At step S52, a color image signal having a document size of A3 size is transmitted.

At step S54, postprocessing is performed.

At step S56, it is determined whether or not bits (X, X+1) in FIF of DIS is set at (1, 0). If YES is determined, the control proceeds to step S58; otherwise, if NO is determined, the control proceeds to step S62.

At step S58, other preprocessing is performed. With bits (17, 18) in FIF of DCS set at (1, 0), bit 68 at 1, bit 69 at 1, and bits (X, X+1) at (1, 0), the designation of transmission of color data of B4 size is declared.

At step S60, a color image signal having a document size of A3 size reduced to B4 size is transmitted.

At step S62, other preprocessing is performed. With bits (17, 18) in FIF of DCS set at (0, 0), bit 68 at 1, bit 69 at 1, and bits (X, X+1) at (0, 0), the designation of transmission of color data at A4 size is declared.

At step S64, a color image signal having a document size of A3 size reduced to A4 size is transmitted.

At step S66, it is determined whether or not bits (X, X+1) in FIF of DIS are set at (1, 0). If YES is determined, the control proceeds to step S68; otherwise, if NO is determined, the control proceeds to step S72.

At step S68, other preprocessing is performed. With bits (17, 18) in FIF of DCS set at (1, 0), bit 68 at 1, bit 69 at 1, and bits (X, X+1) at (1, 0), the designation of transmission of color data of B4 size is declared.

At step S70, a color image signal having a document size of B4 size is transmitted.

At step S72, other preprocessing is performed. With bits (17, 18) in FIF of DCS set at (0, 0), bit 68 at 1, bit 69 at 1, and bits (X, X+1) at (0, 0), the designation of transmission of color data of A4 size is declared.

At step S74, a color image signal having a document size of B4 size reduced to A4 size is transmitted.

At step S76, other preprocessing is performed. With bits (17, 18) in FIF of DCS set at (0, 0), bit 68 at 1, bit 69 at 1, and bits (X, X+1) at (0, 0), the designation of transmission of color data of A4 size is declared.

At step S78, a color image signal having a document size of A4 size is transmitted.

At step S80, it is determined whether or not bits (17, 18) in FIF of DIS are set at (0, 1). If YES is determined, the control proceeds to step S82; otherwise, if NO is determined, the control proceeds to step S86.

At step S82, other preprocessing is performed. With bits (17, 18) in FIF of DCS set at (0, 1), bit 68 at 0, and bit 69 at 0, the designation of transmission of monochrome data of A3 size is declared. Here, bits (X, X+1) are not forwarded.

At step S84, a monochrome image signal having a document size of A3 size is transmitted.

At step S86, it is determined whether or not bits (17, 18) in FIF of DIS are set at (1, 0). If YES is determined, the control proceeds to step S88; otherwise, if NO is determined, the control proceeds to step S92.

At step S88, other preprocessing is performed. With bits (17, 18) in FIF of DCS set at (1, 1), bit 68 at 0, and bit 69 at 0, the designation of transmission of monochrome data of B4 size is declared. Here, bits (X, X+1) are not forwarded.

At step S90, a color image signal having a document size of A3 size reduced to B4 size or a color image signal having a document size of B4 size unchanged is transmitted.

At step S92, other preprocessing is performed.

With bits (17, 18) in FIF of DCS set at (0, 0), bit 68 at 0, and bit 69 at 0, the designation of transmission of monochrome data of A4 size is declared. Here, bits (X, X+1) are not forwarded.

At step S94, a color image signal having a document size of A3 size or B4 size reduced to A4 size is transmitted.

According to the illustrated embodiment, possible specific sizes which are notified from the receiver may include B4 size and A3 size. This enables the image size receivable when color information is received, namely, A4, B4, or A3 size, to be notified from the receiver to the transmitter. Conveniently, the receiver has the capability to receive color information of B4 or A3 size since the transmitter which is to transmit the document information of a document size of B4 size or A3 size can transmit the color information with the same magnification.

Furthermore, according to the illustrated embodiment, when a transmission of color information of a specific size is selected, if the receiver has capability to receive the color information of the specific size, the transmitter can designate a transmission of color data of the specific size, a transmission of full-color data, or a transmission of JPEG data, so that the transmission of color data of the specific size may be executed.

When a transmission of color information is selected at a specific size and if the receiver has the capability to receive color information but does not have the capability to receive color information at the specific size, the transmitter may designate a transmission of color information at the existing size, a transmission of full-color information, or a transmission of JPEG data, and reduce the color data from the specific size to the existing size, so that the transmission of color data may be executed.

According to the illustrated embodiment, when a transmission of color data of A3 size is selected, if the receiver has the capability to receive color data of A3 size, the transmitter may execute the transmission of color data of A3 size. If the receiver does not have the capability to receive color data of A3 size but has the capability to receive color data of B4 size, the transmitter may execute the transmission of color data of B4 size. If the receiver has the capability to receive color data but does not have the capability to receive color data of A3 size or B4 size, the transmitter may execute the transmission of color data of A4 size.

Thus, the capacity required per communication as a memory capacity is considered when the transmitter designates a confidential color communication. However, the capacity is defined according to the receiver's capability to receive color information when a transmission of normal color information (color information which is not confidential) of B4 size or A3 size is selected. When actual color information is transmitted, the designation according to the protocol and a transmission of the actual color information are declared to ensure that color information of other than A4 size is transmitted, which is convenient for users.

Of course, the above-described objects of the present invention is achieved by providing, in the system or apparatus, a storage medium storing program code of software implementing the features in the illustrated embodiment, such that a computer (namely, CPU or MPU) incorporated in the system or apparatus is used to read and execute the program code contained in the storage medium.

In this case, the program code read from the storage medium embodies the novel features of the present invention, and the storage medium storing the program codes falls within the scope of the present invention.

Storage media which may provide the program codes include a floppy disk, a hard disk, an optical disk, a magneto-optical disk, a CD-ROM, a CD-R, a magnetic tape, a non-volatile memory card, a ROM, and an EEPROM.

Furthermore, of course, the present invention may be implemented not only by executing the program code read by the computer, but also by allowing the OS (operating system) running on the computer to execute a part of all of the actual processing in response to the command of the program code.

Moreover, of course, the present invention may be further implemented by writing the program code read from the storage medium into a memory mounted on an extended function board inserted into a computer or an extended function unit connected to a computer, and thereafter allowing a CPU mounted on the extended function board or extended function unit to execute a part of all of the actual processing in response to the command of the program code.

The present invention may be applied to a system comprising a plurality of devices or to an apparatus incorporating a single device.

Of course, the present invention may be implemented by providing a program to the system or apparatus. In this case, a storage medium storing a program represented by software implementing the present invention is played back in the system or apparatus, thereby enabling the system or apparatus to enjoy the advantages of the present invention.

The program represented by software implementing the present invention may be downloaded and is read through a communication program from database over a network, thereby enabling the system or apparatus to enjoy the advantages of the present invention.

The present invention is not limited to the illustrated embodiment, but a variety of modifications may be made without departing from the scope of the appended claims.

What is claimed is:

1. A color facsimile apparatus, comprising:
   a communication circuit arranged to communicate color or monochrome image and control information; and
   a control circuit arranged to fetch first information indicating that color data is receivable or unreceivable, second information indicating that JPEG data is receivable or unreceivable, third information indicating the maximum size receivable when monochrome image or color image defined by ITU-T recommendations is received, and fourth information indicating the maximum size receivable when color image undefined by ITU-T recommendations is received via said communication circuit when DIS, which is a standard function signal defined by ITU-T recommendations and is including the first, second and third information and the fourth information shown by a new bit, is received from a receiver; and
   a reducing circuit arranged to reduce the color or monochrome image,
   wherein, when a color image of larger than the color communication size defined by the ITU-T recommendations is transmitted,
      said communication circuit transmits a color image of the same magnification as a DSC signal that sets a bit indicating size information defined by the ITU-T recommendations to match a new bit indicating size information undefined by the ITU-T recommendations or reduced by the reducing circuit, if the receiver is capable of receiving a color image undefined by the ITU-T recommendations based on said first, second and fourth information,
      said communication circuit transmits a DSC signal to set a bit indicating size information defined by the ITU-T recommendations and a new bit indicating that the undefined size information is invalid and a color image reduced by said reducing circuit, if the receiver is capable of receiving only the color image defined by the ITU-T recommendations based on said first, second and fourth information,
      whereas said communication circuit transmits a DCS signal not including said new bit and a monochrome image, is the receiver is not capable of receiving a color image based on said first and second information.

2. A color facsimile apparatus according to claim 1, wherein the information indicating the maximum size receivable when color data is received comprises information indicating that data of B4 size or A3 size is receivable or unreceivable.

3. A method of controlling a color facsimile apparatus, comprising the steps of:
   fetching, from a receiver, first information indicating that color image is receivable or unreceivable, second information indicating that JPEG data is receivable or unreceivable, third information indicating the maximum size receivable when monochrome image or color image defined by ITU-T recommendations is received, and fourth information indicating the maximum size receivable when color image undefined by ITU-T recommendations is received;

recognizing the size of the color image which is to be transmitted when a standard signal defined by the ITU-T recommendations being a DIS signal including the first to fourth information is received by the receiver; and when the size of the color image which is to be transmitted is larger than the color communication size defined by the ITU-T recommendations, transmitting a DSC signal to set a bit indicating the size information defined by the ITU-T recommendations to match a new bit indicating the size information undefined by the ITU-T recommendations if the receiver is capable of receiving the color image undefined by the ITU-T recommendations and the color image with the same magnification or reduced if the receiver has the capability to receive the color image of that size based on the first, second and fourth information, and transmitting a DCS signal to set a bit indicating the size information defined by the ITU-T recommendations and a new bit indicating that the undefined size information is invalid and the color image with the size being reduced if the receiver does not have the capability to receive the color image of that size.

4. A method according to claim 3, wherein the information indicating the maximum size receivable when color data is received comprises information indicating that data of B4 size or A3 size is receivable or unreceivable.

* * * * *

UNITED STATES PATENT AND TRADEMARK OFFICE
CERTIFICATE OF CORRECTION

| | |
|---|---|
| PATENT NO. | : 7,038,813 B2 |
| APPLICATION NO. | : 09/954069 |
| DATED | : May 2, 2006 |
| INVENTOR(S) | : Takehiro Yoshida |

It is certified that error appears in the above-identified patent and that said Letters Patent is hereby corrected as shown below:

<u>COLUMN 3</u>

Line 16, "designate" should read --there is designated--.

<u>COLUMN 6</u>

Line 38, close up right margin; and
Line 39, close up left margin.

<u>COLUMN 7</u>

Line 28, "is" should read --are--;
Line 45, "of all" should read --or all--; and
Line 54, "of all" should read --or all--.

<u>COLUMN 8</u>

Line 48, "is the" should read --if the--.

Signed and Sealed this

Twenty-eighth Day of November, 2006

JON W. DUDAS
*Director of the United States Patent and Trademark Office*